United States Patent
Seinfeld et al.

(10) Patent No.: US 9,378,370 B2
(45) Date of Patent: Jun. 28, 2016

(54) SCANNING FILES FOR INAPPROPRIATE CONTENT DURING SYNCHRONIZATION

(71) Applicant: Microsoft Corporation, Redmond, WA (US)

(72) Inventors: Marc E. Seinfeld, Fort Lauderdale, FL (US); Daron Spektor, Seattle, WA (US); William M. Zintel, Woodinville, WA (US); Adrian M. Marinescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 13/920,015

(22) Filed: Jun. 17, 2013

(65) Prior Publication Data

US 2014/0373147 A1  Dec. 18, 2014

(51) Int. Cl.
*H04L 29/06* (2006.01)
*G06F 21/56* (2013.01)
*G06F 9/44* (2006.01)

(52) U.S. Cl.
CPC . *G06F 21/56* (2013.01); *G06F 8/68* (2013.01)

(58) Field of Classification Search
CPC .................................. G06F 21/56; G06F 8/68
See application file for complete search history.

(56) References Cited

U.S. PATENT DOCUMENTS

| | | | |
|---|---|---|---|
| 6,578,054 B1 * | 6/2003 | Hopmann et al. | 707/625 |
| 7,086,090 B1 * | 8/2006 | Dawson et al. | 726/24 |
| 8,650,650 B1 * | 2/2014 | Pavlyushchik | 726/24 |
| 8,863,286 B1 * | 10/2014 | Dubrovsky et al. | 726/24 |
| 2004/0158741 A1 * | 8/2004 | Schneider | 713/201 |
| 2004/0237079 A1 | 11/2004 | Cox et al. | |
| 2007/0283438 A1 | 12/2007 | Fries et al. | |
| 2008/0148403 A1 * | 6/2008 | Manion et al. | 726/22 |
| 2008/0295176 A1 * | 11/2008 | Holostov et al. | 726/24 |
| 2009/0282483 A1 * | 11/2009 | Bennett | 726/23 |
| 2010/0077481 A1 | 3/2010 | Polyakov et al. | |
| 2012/0240183 A1 | 9/2012 | Sinha | |
| 2014/0007239 A1 * | 1/2014 | Sharpe et al. | 726/24 |

OTHER PUBLICATIONS

"Collective Intelligence", Published on: Sep. 1, 2008, Available at: http://www.pandasecurity.com/homeusers/solutions/collective-intelligence/.

(Continued)

*Primary Examiner* — Jeffrey Pwu
*Assistant Examiner* — William Corum, Jr.
(74) *Attorney, Agent, or Firm* — Timothy Churna; Kate Drakos; Micky Minhas

(57) ABSTRACT

The present invention extends to methods, systems, and computer program products for scanning files for inappropriate content during file synchronization. Embodiments of the invention are mindful of the order of operations when scanning files for inappropriate content and in subsequent file processing. In some embodiments, during synchronization, an intermediary server scans a file for inappropriate content. The file is not permitted to be fully downloaded to a client device until the scan determines that the file does not contain inappropriate content. In other embodiments, during synchronization, a client device scans a newer version of a file for inappropriate content. An older version of the file is not deleted until the scan determines that the newer version of the file does not contain inappropriate content. In further embodiments, server side scanning and client side scanning are both used to enhance capabilities for detecting inappropriate content.

15 Claims, 4 Drawing Sheets

(56) References Cited

OTHER PUBLICATIONS

Portokalidis, et al., "Paranoid Android: Zero-Day Protection for Smartphones using the Cloud", In Annual Computer Security Applications Conference, Dec. 2010, 20 pages.

"Rapid Rollback", Published on: Feb. 28, 2013, Available at: http://www.webroot.com/En_US/business/secureanywhere-endpoint/abysmal-support/rollback.

"International Search Report & Written Opinion for PCT Application No. PCT/US2014/042212", Mailed Date: Sep. 4, 2014, 9 Pages.

"Rsync", Published on: Feb. 27, 2012, Available at: http://en.wikipedia.org/w/index.php?title=Rsync&oldid=479116076.

Robb, Dr. David, "Developing Firewall Technology: Hardwall—White Paper", In White Paper of Computers and Security, vol. 18, Issue 6, Jan. 1, 1999, pp. 471-478.

* cited by examiner

SCANNING FILES FOR INAPPROPRIATE CONTENT DURING SYNCHRONIZATION

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, cloud storage is used to synchronize data between different devices. For example, an updated version of a file at one device can be transferred to cloud storage. The updated version of the file can then be transferred from cloud storage to one or more other devices to update the file at those devices. However, using cloud storage to synchronize files also potentially introduces a new spread vector for malware. For example, a file infected with a virus can be transferred to cloud storage and then the infected file can be transferred from cloud storage to one or more other devices that are to be updated with the infected file.

Some device side mechanisms are used to scan a received file for malware. However, these device side mechanisms typically unconditionally delete an existing clean copy of a file prior to verifying that a newly received copy of the file does not contain malware. If malware is detected in a newly received copy of a file, the newly received copy of the file is deleted and a sync relationship for the file is broken. Thus, when an existing clean copy of the file is deleted prior to malware detection, the device may not have access to any version of the file.

BRIEF SUMMARY

The present invention extends to methods, systems, and computer program products for scanning files for inappropriate content during synchronization. In some embodiments, a computer system (e.g., a client) receives a portion of data for a newer version of a file from a synchronized distributed storage system. The newer version of the file is to replace an existing version of the file at the computer system. A storage location (e.g., system memory, disk, etc.) at the computer system is identified to store the portion of data. Any remaining portions of data for the newer version of the file are received from the synchronized distributed storage system. The remaining portions of data for the newer version of the file are stored at the storage location.

The portions of data stored at the storage location are scanned for inappropriate content (e.g., malware, data not permitted to leak from the distributed storage system, etc.). Subsequent to and based on the results of the scan either the portions of data stored at the storage location are deleted or the current version of the file is deleted. Accordingly, one remaining version of the file remains at the computer system. The one remaining version of the file is retained as the new current version of the file.

In other embodiments, a computer system (e.g., a server) receives an indication that a client device has initiated downloading a file from a storage system. The computer system indicates to the client device that the computer system intends to scan the file for inappropriate content and that completion of the file download to the client device is not permitted until after the scan completes. The computer system receives one or more portions of the file from the storage system. The one or more portions of the file are also being downloaded to the client device.

The computer system scans the one or more portions of the file for inappropriate content. Subsequent to and based on the results of the scan, the computer system determines if the download to the client device is permitted to complete. The computer system either permits the download to the client device to complete or does not permit the download to the client device to complete based on the determination.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
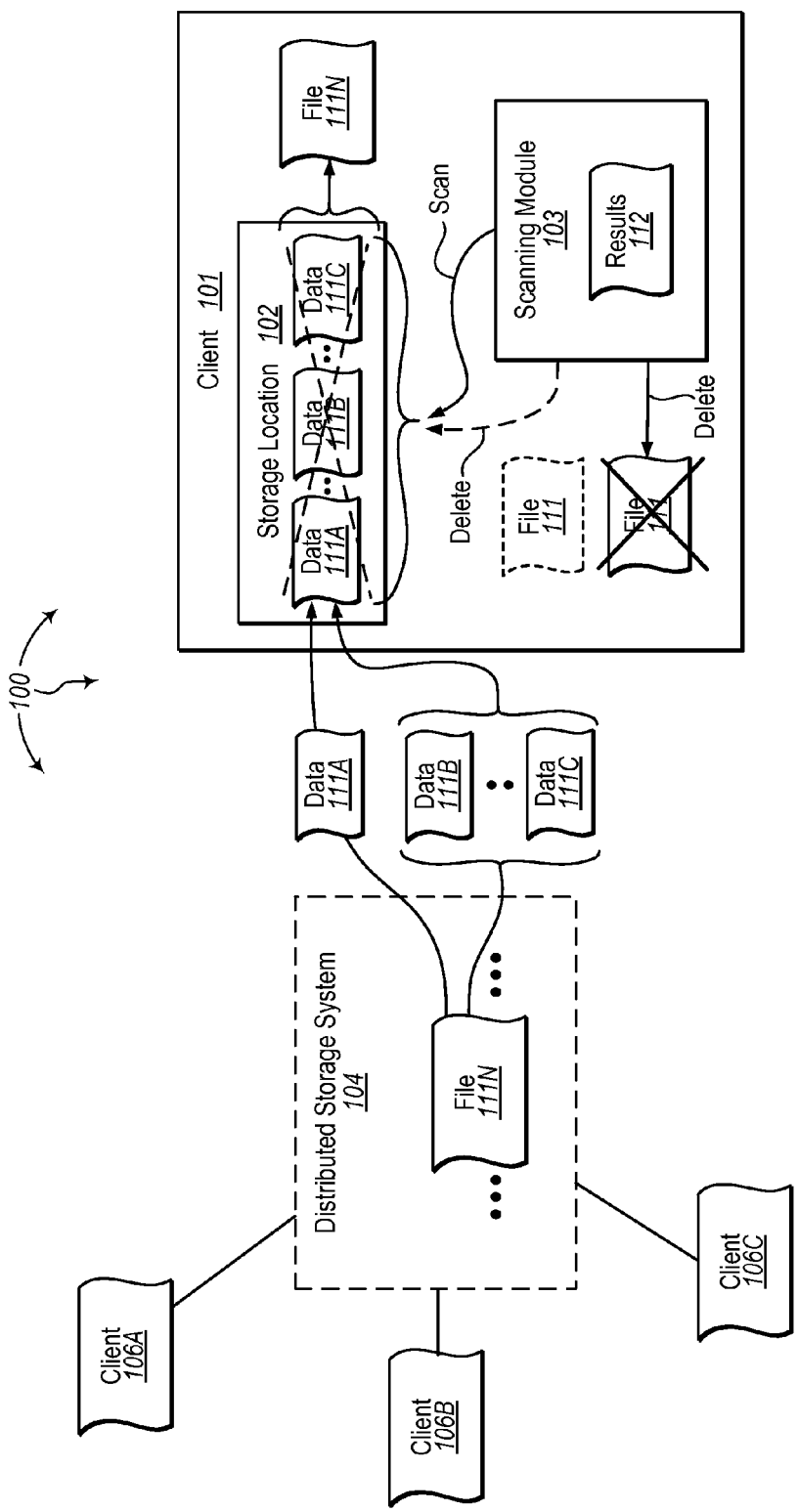
FIG. 1 illustrates an example computer architecture that facilitates scanning files for inappropriate content during synchronization.

The present invention extends to methods, systems, and computer program products for scanning files for inappropriate content during synchronization. In some embodiments, a computer system (e.g., a client) receives a portion of data for a newer version of a file from a synchronized distributed storage system. The newer version of the file is to replace an existing version of the file at the computer system. A storage location (e.g., system memory, disk, etc.) at the computer system is identified to store the portion of data. Any remaining portions of data for the newer version of the file are received from the synchronized distributed storage system. The remaining portions of data for the newer version of the file are stored at the storage location.

The portions of data stored at the storage location are scanned for inappropriate content (e.g., malware, data not permitted to leak from the distributed storage system, etc.). Subsequent to and based on the results of the scan either the portions of data stored at the storage location are deleted or the current version of the file is deleted. Accordingly, one remaining version of the file remains at the computer system. The one remaining version of the file is retained as the new current version of the file.

In other embodiments, a computer system (e.g., a server) receives an indication that a client device has initiated downloading a file from a storage system. The computer system indicates to the client device that the computer system intends to scan the file for inappropriate content and that completion of the file download to the client device is not permitted until after the scan completes. The computer system receives one or more portions of the file from the storage system. The one or more portions of the file are also being downloaded to the client device.

The computer system scans the one or more portions of the file for inappropriate content. Subsequent to and based on the results of the scan, the computer system determines if the download to the client device is permitted to complete. The computer system either permits the download to the client device to complete or does not permit the download to the client device to complete based on the determination.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, "cloud storage" is defined as storage that uses a cloud computing model and/or that operates in a cloud computing environment. In some embodiments, a distributed storage system is implemented using cloud storage. The distributed storage system can include a plurality of storage devices and a plurality of storage servers. Different portions of data for a file can be distributed across the plurality of storage devices and accessed by the plurality of storage servers. Thus, when a client device requests a file, different portions of the file can be accessed from different storage devices (potentially in parallel) and then sent from different storage servers to the client device (potentially in parallel).

In general, embodiments of the invention relate to mechanisms for scanning files for inappropriate content during synchronization. The mechanisms are mindful of order of operations so that files are effectively protected when inappropriate content is detected.

FIG. 1 illustrates an example computer architecture 100 that facilitates scanning files for inappropriate content during synchronization. Referring to FIG. 1, computer architecture 100 includes client 101, distributed storage system 104, and clients 106A-106C. Each of client 101, distributed storage system 104, and clients 106A-106C can be connected to one another over (or be part of) a network, such as, for example, a Local Area Network ("LAN"), a Wide Area Network ("WAN"), and even the Internet. Accordingly, client 101, distributed storage system 104, and clients 106A-106C as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, client 101 and clients 106A-106C can be configured to synchronize files with one another through distributed storage system 104. For example, when a client device from among client 101 and clients 106A-106C has a newer version of a file, the client device can upload the file to distributed storage system 104. The other client devices from among client 101 and clients 106A-106C can then download the newer version of the file and update accordingly. Files can include data files, such as, for example, pictures, video, audio, documents, etc.

As depicted, distributed storage system 104 can include a plurality of storage devices and a plurality of storage servers. Data for a plurality of different files can be distributed across the plurality of storage devices. In some embodiments, different portions of a file are distributed across the plurality of storage devices. Thus, when a file is requested by a client device, one or more of the plurality of storage servers can access different portions of the file from different storage devices. The one or more storage servers can individually send the accessed different file portions to the requesting client device.

Alternately, different portions of the file can be sent to an intermediary server. The intermediary server can construct the file from the various different portions and then send the file to the requesting client device. The intermediary server can also perform various scanning operations to determine if any portions of the file contain inappropriate content.

In some embodiments, portions of a file are sent to a requesting client device and an intermediary server in parallel.

As depicted, client 101 includes storage location 102 and scanning module 103. Storage location 102 can be virtually any type of storage, such as, for example, system memory or a more durable storage device (e.g. magnetic, optical, etc.). When a file is being downloaded to client 101, portions of the file can be stored at storage location 102. Scanning module 103 can be configured to scan data at client 101, including received data stored in storage location 102, for various types of inappropriate content including malware and content that has transfer restrictions.

Scanning module 103 can delete files that include detected inappropriate content. Thus, when scanning module 103 detects inappropriate content in a newer version of a file, portions of the newer version of the file are deleted from storage location 102 (and a current version of the file is can be retained). On the other hand, when scanning module 103 does not detect in a newer version a file, the newer version of the file is permitted to replace a current version of the file. When a newer version of a file replaces a current version of the file, client 101 can redirect operations directed to the current version of the file to instead go to the newer version of the file.

Inappropriate content can include malicious software, such as, viruses, worms, Trojan horses, rootkits, keyloggers, adware, spyware as well as other types of malware. Thus, scanning module 103 can protect synchronization relationships from being a vector for malware. Inappropriate content can also include content that is not permitted to reach or leave a client device or that is not permitted to reach or leave cloud storage. Thus, scanning module 103 can also protect synchronization relationships from being a vector for data leakage.

Figure 2:
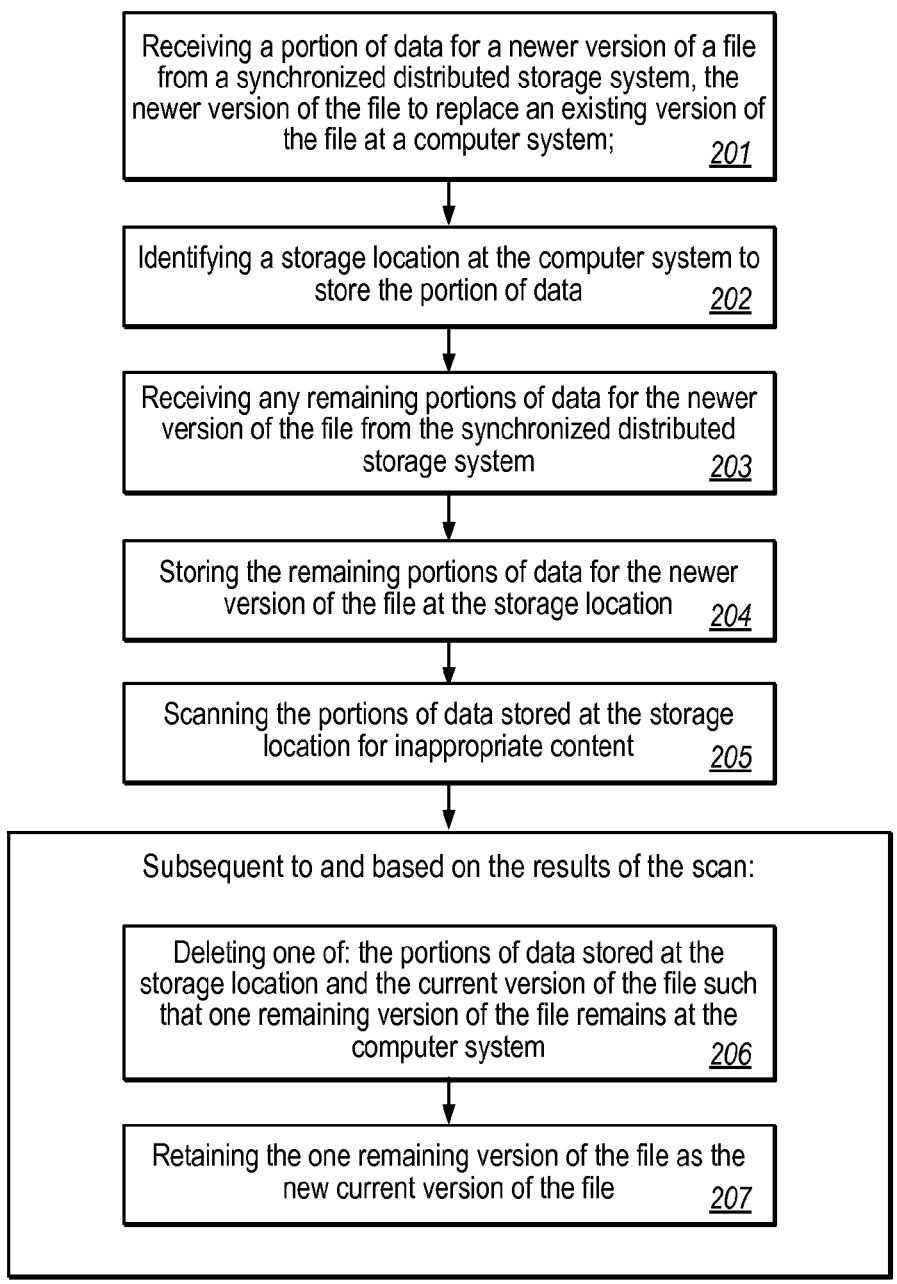
FIG. 2 illustrates a flow chart of an example method for scanning files for inappropriate content during synchronization.

FIG. 2 illustrates a flow chart of an example method 200 for scanning files for inappropriate content during synchronization. Method 200 will be described with respect to the components and data of computer architecture 100.

Client 101 can send a synchronization request to distributed storage system 104 to request newer versions for any files stored at client 101. Distributed storage system 104 can detect file 111N is a newer version of file 111. In response, distributed storage system 104 can initiate sending portions of file 111N to client 101. For example, distributed storage system 104 can send data 111A-111C (i.e., portions of file 111N) to client 101. File 111N can previously have been uploaded to distributed storage system 104 by any of clients 106A-106C.

Method 200 includes receiving a portion of data for a newer version of a file from the synchronized distributed storage system, the newer version of the file to replace an existing version of the file at the computer system (201). For example, client 101 can receive data 111A from distributed storage system 104. As described, data 111A is a portion of file 111N (a newer version that is to replace file 111). Client 101 can receive data 111A as part of a synchronization operation to synchronize data between client 101 and clients 106A-106C.

Method 200 includes identifying a storage location at the computer system to store the portion of data (202). For example, client 101 can identify storage location 102 (e.g., system memory, disk, etc.) to store data 111A. Client 101 can store data 111A at storage location 102. Method 200 includes receiving any remaining portions of data for the newer version of the file from the synchronized distributed storage system (203). For example, client 101 can receive data 111B-111C from distributed storage system 104. Client 101 can receive data 111B-111C as part of a synchronization operation to synchronize data between client 101 and clients 106A-106C. Method 200 includes storing the remaining portions of data for the newer version of the file at the storage location (204). For example, client 101 can store data 111B-111C at storage location 102.

Method 200 includes scanning the portions of data stored at the storage location for inappropriate content (205). For example, scanning module 103 can scan data 111A-111C (at storage location 102) for inappropriate content, such as, for example, malware and/or content leaked from distributed storage system 104. Scanning module 103 may or may not detect inappropriate content in one or more of data 111A-111C.

Scanning module 103 can record results of scanning data 111A-111C in results 112. When scanning module 103 detects inappropriate content in one or more of data 111A-111C, scanning module 103 can record an indication that file 111N contains inappropriate content (and possibly also the type or types of inappropriate content). On the other hand, when scanning module 103 does not detect inappropriate content in any of data 111A-111C, scanning module 103 can record an indication that file 111N does not include inappropriate content (and/or that file 111N is "clean"). In some embodiments, results 112 are presented to a user for informational purposes.

Subsequent to and based on the results of the scan, method 200 includes deleting one of: the portions of data stored at the storage location and the current version of the file such that one remaining version of the file remains at the computer system (206). For example, subsequent to scanning data 111A-111C, results 112 can indicate that inappropriate content was detected in one or more of data 111A-111C. Based results 112 indicating detected inappropriate content, data 111A-111C can be deleted from storage location 102 (as indicated be the dashed line "Delete" and dashed lines marking out data 111A-111C). When results 112 indicate that inappropriate content was detected, client 101 can break a synchronization relationship between file 111N and file 111.

On the other hand, subsequent to scanning data 111A-111C, results 112 can indicate that inappropriate content is not contained in any of data 111A-111C (or that file 111N is "clean"). Based results 112 indicating that data 111A-111C does not contain inappropriate content (or that file 111N is "clean"), file 111 can be deleted (as indicated be the solid line "Delete" and sold lines marking out file 111N). In either embodiment, data can be deleted subsequent to scanning of data 111A-111C.

Method 200 includes retaining the one remaining version of the file as the new current version of the file (207). For example, when data 111A-111C is deleted, file 111 can be retained (as indicated by the dashed line version of data 111). On the other hand, when file 111 is deleted, data 111A-111C can be written to file 111N at client 101. In some embodiments, file 111N is given the same file name file 111 had prior to deletion.

After file 111N is written, client 101 can redirect operations directed to file 111 to instead be directed to file 111N.

Thus, embodiments of the invention are mindful of the order of operations when scanning and deleting data at a client device. For example, during synchronization, deleting an existing version of a file is conditional. That is, the existing version of the file is retained until scan results indicate that the newer version of the file is free of inappropriate content.

Figure 3:
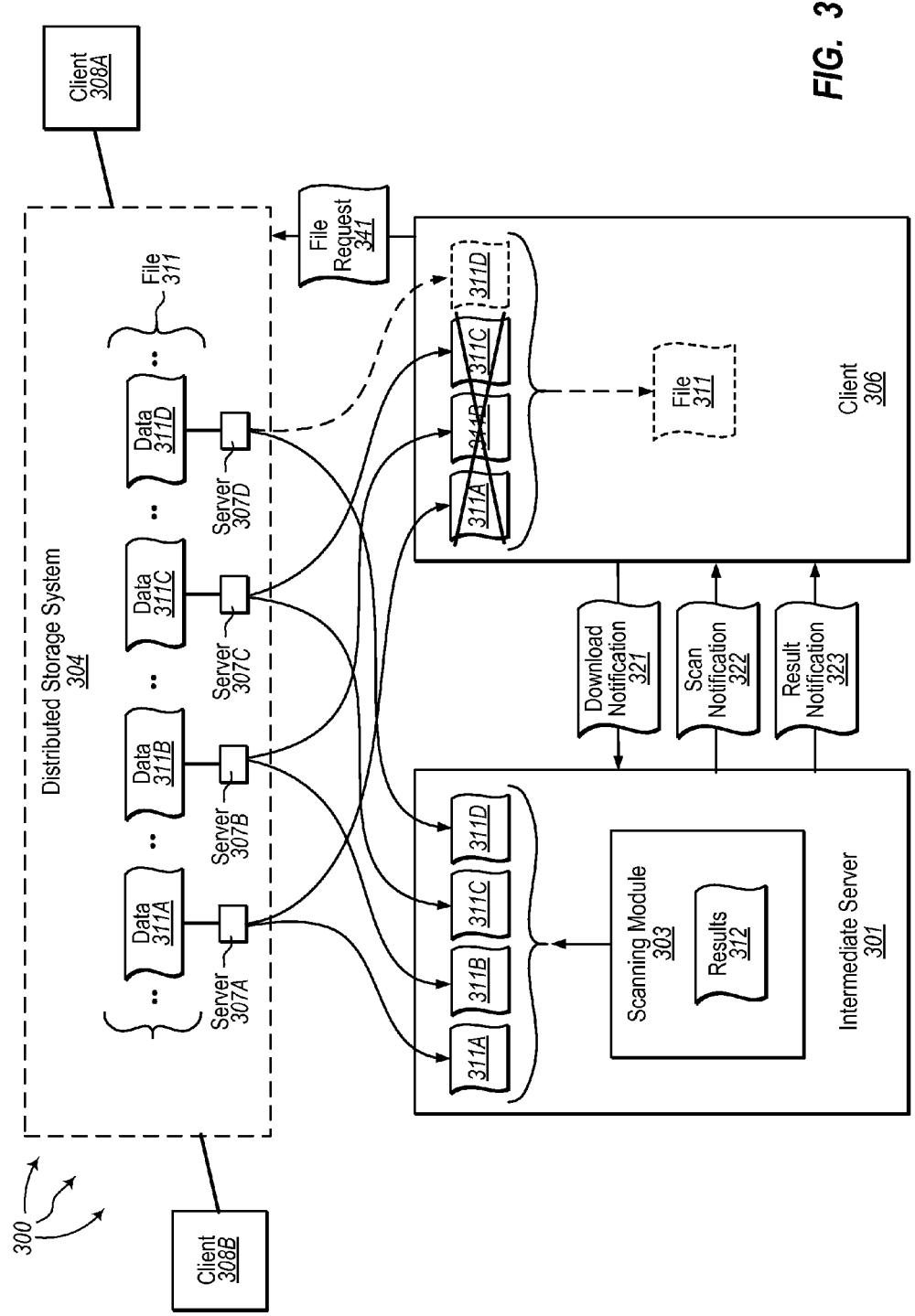
FIG. 3 illustrates an example computer architecture that facilitates scanning a downloading file for inappropriate content.

Referring now to FIG. 3, FIG. 3 illustrates an example computer architecture 300 that facilitates scanning a downloading file for inappropriate content. As depicted, computer architecture 300 includes intermediary server 301, distributed storage system 304, client 306, and clients 308A and 308B. Each of intermediary server 301, distributed storage system 304, client 306, and clients 308A and 308B can be connected to one another over (or be part of) a network, such as, for example, a Local Area Network ("LAN"), a Wide Area Network ("WAN"), and even the Internet. Accordingly, intermediary server 301, distributed storage system 304, client 306, and clients 308A and 308B as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, client 306, client 308A, and client 308B can be configured to synchronize files with one another through distributed storage system 304. For example, when a client device from among client 306, client 308A, and client 308B has a newer version of a file, the client device can upload the file to distributed storage system 304. The other client devices from among client 306, client 308A, and client 308B can then download the newer version of the file and update accordingly. Files can include data files, such as, for example, pictures, video, audio, documents, etc.

As depicted, distributed storage system 304 includes a plurality of servers 307A-307D. Within distributed storage system 304, data for a plurality of different files can be distributed across plurality of storage devices. In some embodiments, different portions of a file are distributed across the plurality of storage devices. Thus, when a file is requested by a client device, one or more of the plurality of servers 307A-307D can access different portions of the file from different storage devices. The one or more of the plurality of servers 307A-307D can individually send the accessed different file portions to the requesting client device.

When a client device, such as, for example, client 306 requests a file from distributed storage system 304, the client device can notify intermediary server 301 of the download request. In response, intermediary server 301 can also initiate download of the file. Alternately, upon receiving a download request from a client device, distributed store system 304 can automatically initiate download of a requested file to the client device and also initiate download of the requested file to intermediary server 301 in a parallel.

As depicted, intermediary server 301 includes scanning module 303. Scanning module 303 can be configured to scan data at intermediary server 301 for various types of inappropriate content including malware and content that has transfer restrictions. When portions of a file are being sent to both a client device and intermediary server 301, intermediary server 301 can prevent completion of the client download until scanning module 303 scans the portions of the file for inappropriate content. When scanning module 303 detects inappropriate content in a file, intermediary server 301 notifies the client that the client is not permitted to complete downloading the file. When scanning module 303 does not detect inappropriate content in a file, intermediary server 301 notifies the client that the client is permitted to complete downloading the file. As described, inappropriate content can include malware, content with transfer restrictions, etc.

Figure 4:
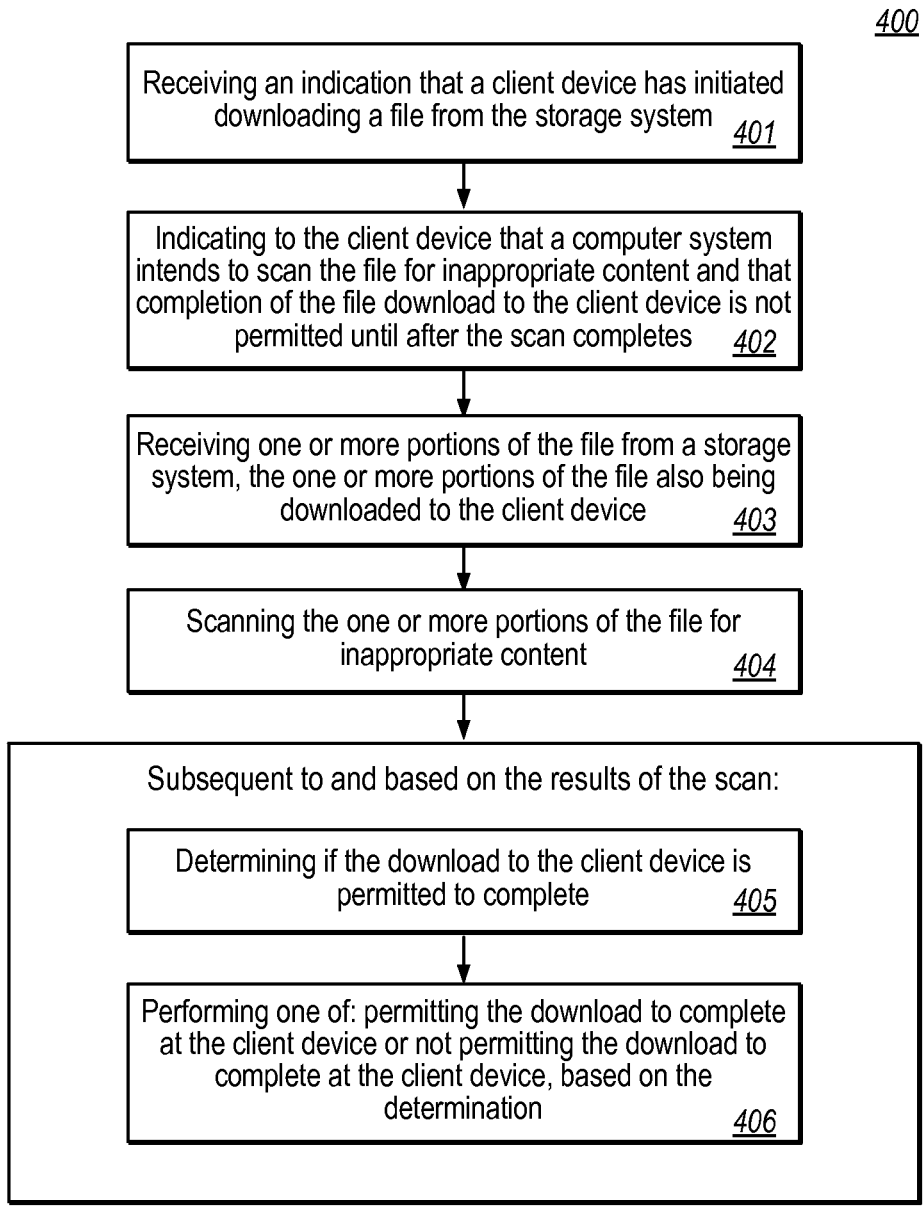
FIG. 4 illustrates a flow chart of an example method for scanning a downloading file for inappropriate content.

FIG. 4 illustrates a flow chart of an example method 400 for scanning a downloading file for inappropriate content. Method 400 will be described with respect to the components and data of computer architecture 300.

Client 306 can send file request 341 to distributed storage system 304. File request 342 can be a request for file 311. File 311 can include data 311A-331D, which are distributed across different storage devices of distributed storage system 304. To download file 311 to client 306, servers 307A-307D can access data 311A-311D respectively form the different storage devices. Servers 307A-307D can then initiate sending data 311A-311D respectively to client 306.

Along with sending file request 341, client 306 can send download notification 321 to intermediary server 301. Download notification 321 notifies intermediary server 301 that client 306 is downloading file 311.

Method 400 includes receiving an indication that the client device has initiated downloading a file from the storage system (401). For example, intermediary server 301 can receive download notification 321 from client 306. Alternately, intermediary server 301 may begin to receive portions of file 311 from distributed storage system 304 along with an indication that client 306 is downloading file 311. As such, one or both of client 306 and distributed storage system 304 can notify intermediary server 301 that file 311 is being downloaded to client 306.

Method 400 includes indicating to the client device that the computer system intends to scan the file for inappropriate content and that completion of the file download to the client device is not permitted until after the scan completes (402). For example, intermediary server 301 can send scan notification 322 to client 306. Scan notification 322 indicates to client 306 that intermediary server 301 intends to scan file 311 for inappropriate content. Scan notification 322 also indicates to client 306 that downloading file 311 is not permitted to complete until the scan of file 311 completes.

Method 400 includes receiving one or more portions of the file from the storage system, the one or more portions of the file also being downloaded to the client device (403). For example, intermediary server 301 can receive data 311A-311D from servers 307A-307D respectively. As depicted, data 311A-311D is also being downloaded to client 306 from servers 307A-307D respectively.

Method 400 scanning the one or more portions of the file for inappropriate content (404). For example, scanning module 303 can scan data 311A-311D for inappropriate content, such as, for example, malware and/or content leaked from distributed storage system 304. Scanning module 303 may or may not detect inappropriate content in one or more of data 311A-311D.

Scanning module 303 can record results of scanning data 311A-311D in results 312. When scanning module 303 detects inappropriate content in one or more of data 311A-311D, scanning module 303 can record an indication that file 311 contains inappropriate content (and possibly also the type or types of inappropriate content). On the other hand, when scanning module 303 does not detect inappropriate content in any of data 311A-311D, scanning module 303 can record an indication that file 311 does not include inappropriate content (and/or that file 311 is "clean").

Subsequent to and based on the results of the scan, method 400 includes determining if the download to the client device is permitted to complete (405). For example, based on results 312, intermediary server 301 can determine if downloading file 311 to client 306 is permitted to complete. In some embodiments, subsequent to scanning data 311A-311D, results 312 indicate that inappropriate content was detected in one or more of data 311A-311D. Based results 312 indicating detected inappropriate content, intermediary server 301 determines that downloading file 311 to client 106 is not permitted to complete. In other embodiments, subsequent to scanning data 311A-311D, results 312 indicate that inappropriate content was not detected in any of data 311A-311D (or that file 311 is "clean"). Based on results 312 indicating that inappropriate content was not detected, intermediary server 301 determines that downloading file 311 to client 106 is permitted to complete. In either embodiment, data 311A-311D can be deleted from intermediary server 301.

Subsequent to and based on the results of the scan performing one of: permitting the download to complete at the client device or not permitting the download to complete at the client device, based on the determination (406). For example, intermediary server 301 can send result notification 323 to client 306. Result notification 323 can indicate whether or not downloading file 311 to client 306 (e.g., in parallel with downloading to intermediary server 301) is permitted to complete. When downloading file 311 (e.g., in parallel) is permitted to complete, client 306 can download data 311A-331D. Client 306 can write file 311 from data 311A-311D. When downloading file 311 is not permitted to complete, any of data 311A-311D already downloaded to client 306 can be deleted.

Thus, embodiments of the invention are mindful of the order of operations when scanning a file that is to be downloaded to a client device. For example, during synchronization, an intermediary server can scan the file for inappropriate content. The client device is not permitted to complete downloading the file until the scan determines that the file does not contain inappropriate content. Subsequent to determining that the file does not contain inappropriate content, the client device is permitted to complete downloading the file.

Embodiments of the invention can interoperate with one another to provide enhanced capabilities for detecting inappropriate content during synchronization. For example, an intermediary server can scan a newer version of a file for inappropriate content prior to permitting a client device to complete downloading the newer version of the file (e.g., in accordance with method 400). After the intermediary server scans the newer version of the file and when inappropriate content is not detected, the client device can complete downloading the newer version of the file. The client device can again scan the newer version of the file for inappropriate content (e.g., in accordance with method 200). After the client device scans the newer version of the file and when inappropriate content is not detected, the client device can replace an older version of the file with the newer version of the file.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for using a computer system to scan files for inappropriate content during synchronization, the computer system including a processor and system memory, the computer system including a sync client communicatively coupled to a synchronized distributed storage system, the sync client configured to synchronize files with other sync clients coupled to the synchronized distributed storage system, the method comprising:

receiving a one or more portions of data associated with a newer version of a file from the synchronized distributed storage system, the newer version of the file designated to replace an existing version of the file at the computer system, the newer version of the file previously uploaded to the synchronized distributed storage system by another sync client;
identifying a storage location at the computer system to store the one or more portions of data;
storing the one or more portions of data at the storage location;
maintaining a synchronization relationship to the existing version of the file at the sync client including, prior to permitting the newer version of the file to replace the existing version of the file and prior to deleting the existing version of the file:
accessing the storage location to scan the one or more portions of data for inappropriate content; and
determining whether the one or more portions of data are free from inappropriate content; and
based at least on determining that the one or more portions of data are free from inappropriate content, breaking the synchronization relationship by at least deleting the existing version of the file and replacing the existing version of the file with the newer version of the file.

2. The method of claim 1, wherein accessing the storage location to scan the one or more portions of data for inappropriate content comprises scanning the one or more portions of data to prevent data leakage.

3. The method of claim 1, further comprising:
making the received one or more portions of data available at the computer system by redirecting operations for the file to the received portions of data.

4. The method as recited in claim 1, wherein accessing the storage location to scan the one or more portions of data for inappropriate content comprises scanning the one or more portions of data for viruses.

5. The method as recited in claim 1, wherein accessing the store location to scan the one or more portions of data for inappropriate content comprises scanning the one or more portions of data for content that is not permitted to be downloaded to the computer system.

6. The method claim 1, wherein the storage location is one of: system memory and a file.

7. A method for use at a computer system, the computer system including a processor and system memory, the computer system communicatively coupled to a client device and a storage system, the client device configured to download files from the storage system, the method for scanning a downloading file for inappropriate content, the method comprising:
receiving an indication that the client device has initiated downloading a version of a file from the storage system, the version of the file to replace an existing version of the file at the client device;
indicating to the client device that:
the computer system intends to download and scan the version of the file for inappropriate content; and
the computer system is protecting a synchronization relationship between the client device and the existing version of the file by preventing the client device from completing the download of the version of the file from the storage system until after the scan completes;
receiving one or more portions of the version of the file from the storage system, the one or more portions of the version of the file also being downloaded to the client device;
scanning the one or more portions of the version of the file for inappropriate content;
upon completion of the scan, determining that the one or more portions of the version of the file are free from inappropriate content;
in response to and subsequent to determining that the one or more portions of the version of file are free from inappropriate content, permitting the client device to break the synchronization relationship with the existing version of the file, including:
determining that the client device is permitted to complete the download of the version of the file from the storage system based on the scan results; and
permitting the client device to complete the download of the version of the file at the client device to replace the existing version of the file with the version of the file; and
wherein the one or more portions of the file are downloaded to the client device prior to completion of the scan.

8. The method of claim 7, wherein the storage system is a distributed storage system, the distributed storage system including a plurality of distributed servers, wherein at least one portion of the version of the file is accessed from a first server selected from among the plurality of servers, and wherein at least one other portion of the version of the file is accessed from a second different server selected from among the plurality of servers, and
wherein receiving one or more portions of the version of the file from the storage system comprises:
receiving the at least one portion of the version of the file from the first server in parallel with the at least one portion of the version of the file also being download from the first server to the client device; and
receiving the at least one other portion of the version of the file from the second different server in parallel with the at least one other portion of the file also being download from the second different server to the client device.

9. The method of claim 7, wherein receiving one or more portions of the version of the file from the storage system comprises receiving one or more portions of the version of the file that are to be used for synchronizing the file at the client device.

10. The method of claim 7, wherein determining that the client device is permitted to complete the download of the version of the file comprises determining that the client is permitted to complete a parallel download of the version of the file in parallel with a download of the version of the file to the computer system.

11. The method of claim 10, further comprising notifying the client device that the client device is permitted to complete the parallel download.

12. A system, the system comprising:
a distributed storage system;
an intermediary server;
a plurality of client devices;
wherein the intermediary server configured to:
receive an indication that a client device, from among the plurality of client devices has initiated downloading a file from the distributed storage system, the version of the file to replace an existing version of the file at the client device;
indicate to the client device that:
the intermediary server intends to download and scan the version of the file for inappropriate content and;
a synchronization relationship between the client device and the existing version of the file is being protected by preventing the client device form completing the download of the version of the file from the distributed storage system until after the scan completes;

receive one or more portions of the version of the file from the distributed storage system, the one or more portions of the version of the file also being downloaded to the client device;

scan the one or more portions of the version of the file for inappropriate content;

upon completion of the scan, determine that the one or more portions of the version of the file are free from inappropriate content;

in response to and subsequent to determining that the one or more portions of the version of the file are free from inappropriate content, permitting the client device to break the synchronization relationship, including:

determine that the client device is permitted to complete the download of the version of the file from the distributed storage system based on the results of the scan; and permit the client device to complete the download of the version of the file at the client device to replace the existing version of the file with the version of the file; and wherein the one or more portions of the file are downloaded to the client device prior to completion of the scan; and wherein each of the plurality of clients is configured to:
receive the one or more portions of the version of the file from the intermediary server;
storing the one or more portions of the version of the file at the storage location;
protect the synchronization relationship including, prior to permitting the version of the file to replace the existing version of the file and prior to deleting the existing version of the file:
scanning the portions of the version of the file stored at the storage location for inappropriate content;
subsequent to and based on the results of the scan:
deleting one of: the version of the file at the storage location and the existing version of the file such that one remaining version of the file remains at the client device; and
retaining the one remaining version of the file as the new current version of the file.

13. The system of claim 12, wherein the intermediary server being configured to determining that the client device is permitted to complete the download of the version of the file comprises the intermediary server being configured to determine that a parallel download of the version of the file to the client device is permitted to complete; and
wherein the intermediate server is further configured to notify the client device that the parallel download is permitted to complete.

14. The system of claim 12, wherein each of the plurality of clients being configured to delete one of: the version of the file at the storage location and the existing version of the file comprises each of the plurality of clients being configured to delete the portions of data stored at the storage location based on the scan detecting inappropriate content contained within at least one of the received portions of data; and
further comprising each of the plurality of clients being configured to break a synchronization relationship between the client and the existing version of the file.

15. The system of claim 12, each of the plurality of clients being further configured to:
make the one or more received portions of the version of the file available at the computer system by redirecting operations directed to the existing version of the file to the version of the file; and
remove the current version of the file.

* * * * *